United States Patent
Posamentier

(10) Patent No.: US 8,451,098 B2
(45) Date of Patent: May 28, 2013

(54) SWITCHABLE ACTIVE-PASSIVE RFID TAG

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 826 days.

(21) Appl. No.: 11/833,998

(22) Filed: Aug. 5, 2007

(65) Prior Publication Data

US 2009/0033463 A1 Feb. 5, 2009

(51) Int. Cl.
*H04B 7/00* (2006.01)

(52) U.S. Cl.
USPC .................. 340/10.5; 340/10.1; 340/10.3

(58) Field of Classification Search
USPC ........................ 340/10.5, 10.1, 10.3
See application file for complete search history.

(56) References Cited

U.S. PATENT DOCUMENTS

| | | | | |
|---|---|---|---|---|
| 6,078,258 | A * | 6/2000 | Auerbach et al. | 340/568.2 |
| 7,098,770 | B2 * | 8/2006 | Charrat et al. | 340/10.1 |
| 2003/0104848 | A1 * | 6/2003 | Brideglall | 455/574 |
| 2006/0290496 | A1 * | 12/2006 | Peeters | 340/572.1 |
| 2007/0013521 | A1 * | 1/2007 | Lindsay et al. | 340/572.1 |
| 2007/0018832 | A1 * | 1/2007 | Beigel et al. | 340/572.7 |
| 2007/0176748 | A1 * | 8/2007 | Salamitou | 340/10.1 |
| 2007/0200684 | A1 * | 8/2007 | Colby | 340/10.51 |
| 2007/0262862 | A1 * | 11/2007 | Barrett et al. | 340/539.15 |
| 2008/0051154 | A1 * | 2/2008 | Schlomann et al. | 455/567 |
| 2008/0169909 | A1 * | 7/2008 | Park et al. | 340/10.4 |

* cited by examiner

*Primary Examiner* — Brian Zimmerman
*Assistant Examiner* — Omer S Khan
(74) *Attorney, Agent, or Firm* — Schwegman, Lundberg & Woessner, P.A.

(57) ABSTRACT

Various embodiments of the invention combine a passive RFID tag with a manually switchable battery for additional transmit range when needed. In some embodiments, connecting the battery may also modify the contents of the data transmitted from the RFID tag. This feature may be particularly useful in applications in which a device generally only needs to identify itself as being in a small area, but may occasionally need to send out an alert with greater range.

7 Claims, 2 Drawing Sheets

SWITCHABLE ACTIVE-PASSIVE RFID TAG

BACKGROUND

Radio frequency identification (RFID) tags typically transmit a response to a signal from an RFID reader by backscattering the received signal. 'Backscatter' means that a small portion of the received signal is reflected back from the antenna, and this reflected signal may be modulated to carry information by modulating the antenna's impedance. At a minimum, an RFID tag may transmit its identification code, but it may also transmit other information and/or it may receive information. 'Active' RFID tags get their operating power from a battery, while 'passive' RFID tags get their operating power by harvesting energy from the signal received from the RFID reader. Passive tags may have advantages such as low cost, light weight, small form factor, and long operational life due to the absence of a battery, but have limited range since only a few microwatts may typically be harvested. Active RFID tags may be more expensive, heavier, larger, and their operating life limited by the battery, but their range may be much greater due to the power available from the battery. Some applications are more suited to passive tags, while other applications are more suited to active tags. However, some applications could benefit from both, but placing both types of RFID tag on the same object may greatly increase the cost.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
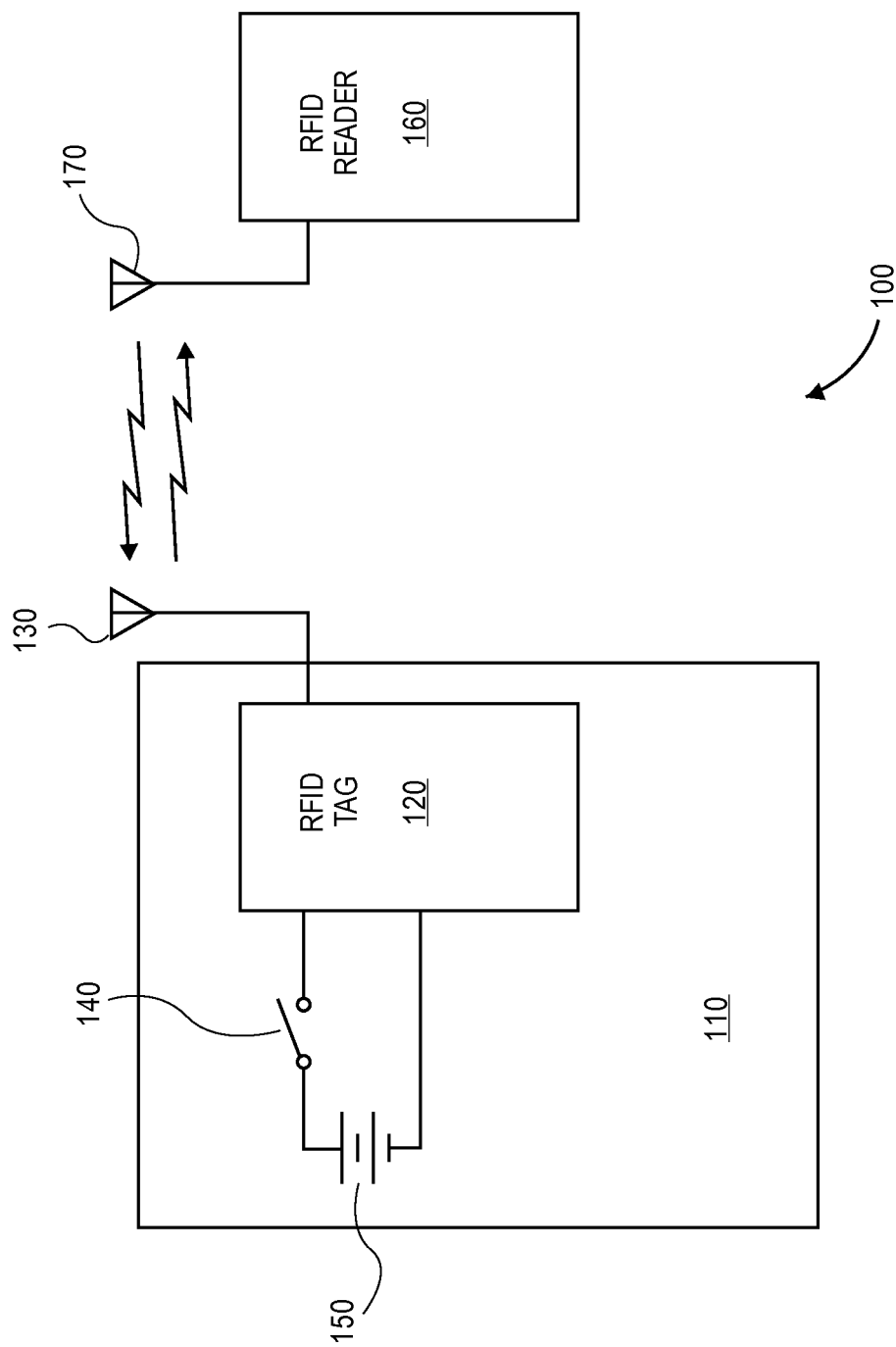
FIG. 1 shows a block diagram of components in an RFID system, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" indicates that two or more elements are in direct physical or electrical contact with each other. "Coupled" indicates that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not.

Within the context of this document, an RFID tag (sometimes referred to as an RFID transponder) is defined as comprising an RFID antenna (to receive an incoming wireless signal that serves to activate the RFID tag, and to transmit a wireless response in the form of a modulated radio frequency signal), and an RFID tag circuit (which may include circuitry to store an identification code for the RFID tag, circuitry to transmit that code through the antenna, and in some embodiments a power circuit to collect received energy from the incoming radio frequency signal and use some of that energy to power the operations of the RFID tag circuit). The RFID tag circuit and/or the RFID antenna may be in a standalone package, or may be incorporated in a package with other circuitry (e.g., on a printed circuit board or in a semiconductor die containing other circuitry). As is known in the field of RFID technology, "transmitting" a signal from an RFID tag may include reflecting a modulated version of the received carrier signal, a technique known as 'backscattering'. Within the context of this document, an RFID reader is a device that wirelessly receives the backscattered signal from the RFID tag, after the RFID tag has been caused to wirelessly transmit the aforementioned response. In some embodiments an RFID reader may also transmit data and/or instructions to the RFID tag, which may affect the response from the RFID tag. A 'passive RFID tag' is an RFID tag that obtains its operating power by harvesting energy from the radio frequency signal received through its antenna, while an 'active RFID tag' is an RFID tag that obtains its operating power by being connected to a battery or other physically tangible power source (e.g., a power supply).

Various embodiments of the invention may combine a normally passive RFID tag with a battery, and a switch to connect the battery upon demand, thereby converting the passive RFID tag into an active RFID tag to obtain greater transmit range by the RFID tag. For example, a hospital identification bracelet could be used to identify a particular patient to each nurse's local RFID reader through the use of a passive RFID tag in the bracelet. But when in distress and unattended, the patient could send out an emergency notice to more distant RFID readers by pressing a button to connect the battery to the RFID tag.

FIG. 1 shows a block diagram of components in an RFID system, according to an embodiment of the invention. In the illustrated system 100, an RFID tag 120 may respond to wireless signals from an RFID reader 160 by transmitting a backscattered signal to the RFID reader, utilizing their antennas 130 and 170, respectively. The signal received from the RFID reader may be any type of signal typically used to trigger a response. For example, in some embodiments a simple carrier wave of the right frequency may be sufficient to cause the RFID tag to respond. In other embodiments, the information content of the signal from the RFID reader may be used to select one or more RFID tags to respond. Several such techniques of tag activation and selection are already known, and are not described in detail here.

RFID tag 120 may operate in a passive mode most of the time (i.e., harvesting energy from the signal received through its antenna to provide operating power to the RFID tag circuitry). But when switch 140 is closed, battery 150 may provide the operating power to the RFID tag 120, thus placing the RFID tag 120 in an active mode of operation. Since the electrical power available from the battery may be many times greater than the power harvested from a received signal, the effective range of transmissions from the RFID tag may be several times greater in the active mode than in the passive mode.

In some embodiments, closing switch 140 may also change the data that is transmitted from RFID tag 120. For example, the identification address (i.e., identification code) of RFID tag 120 may include one or more bits that are alterable, and the state of those one or more bits may indicate to the RFID reader 160 whether the responding RFID tag is operating in the active mode or the passive mode. Alternately, one or more bits may be appended to the RFID tag's address, and the state of those one or more bits may indicate whether the RFID tag is operating in the active mode or the passive mode.

Switch 140 may be of any feasible physical type. For example, the switch may be any of, but is not limited to: 1) a membrane switch, 2) a push-button switch, 3) a slide switch, 4) etc. Switch 140 may also be of any feasible functional type. For example, the switch may be any of, but is not limited to: 1) a momentary contact switch (only closed when physical pressure is applied to the switch), 2) a latching switch (remains closed after pressure is released from the switch), 3) a toggle switch (pressing the switch changes its state from closed-to-open, or from open-to-closed), 4) etc.

Battery 150 may be of any feasible type. For example, the battery may be any of, but is not limited to: 1) a thick film battery, 2) a permanently-attached battery, 3) a replaceable battery, 4) a rechargeable battery, 5) etc.

In some embodiments, RFID tag 120, switch 140, and battery 150 may be part of a larger object, designed to perform in a particular application. For example, object 110 may be designed to simply identify itself to a nearby RFID reader 160 under normal circumstances, by allowing the RFID tag 120 to operate in the passive mode within the associated limited range. But under special circumstances, when the switch 140 is closed, the RFID tag 120 may transmit an alert to the RFID reader 160 by operating in the active mode, thereby alerting the RFID reader 160 to an alert condition associated with the object 110. Further, in some embodiments the combination of RFID tag 120, switch 140, and battery 150 may be designed for single-use applications of the active mode. For example, once the switch is closed, the battery connected, and the alert condition has been transmitted, the battery may be effectively drained so that it might have insufficient charge for further dependable alert conditions.

In some embodiments, object 110 may be a personal identification object, such as a badge, bracelet, card, etc. For example, object 110 might be a patient identification bracelet used in a hospital or other medical facility to identify patients to the facility's computers. Under normal conditions, an attending nurse may use his/her portable RFID reader to verify the patient's identity and call up the associated medical chart from the hospital computers. But if the patient is in distress and the nurse is not present, the patient could press the switch on the identification bracelet, converting the RFID tag to active mode, thereby sending out an alert to an RFID reader that might be too far away to receive the signal if the RFID tag were still in passive mode. The RFID reader may then notify the hospital computers of this alert, and the hospital computers may notify a nurse. Similar applications may be found in other environments, such as home monitoring of persons in poor health who could be subject to heart attacks, injury by falling, etc. RFID readers within the home could monitor the person's movement through the home, but in an emergency the person could send an alert that they were in distress and needed prompt attention, simply by pressing the button on their personal identification device.

Figure 2:
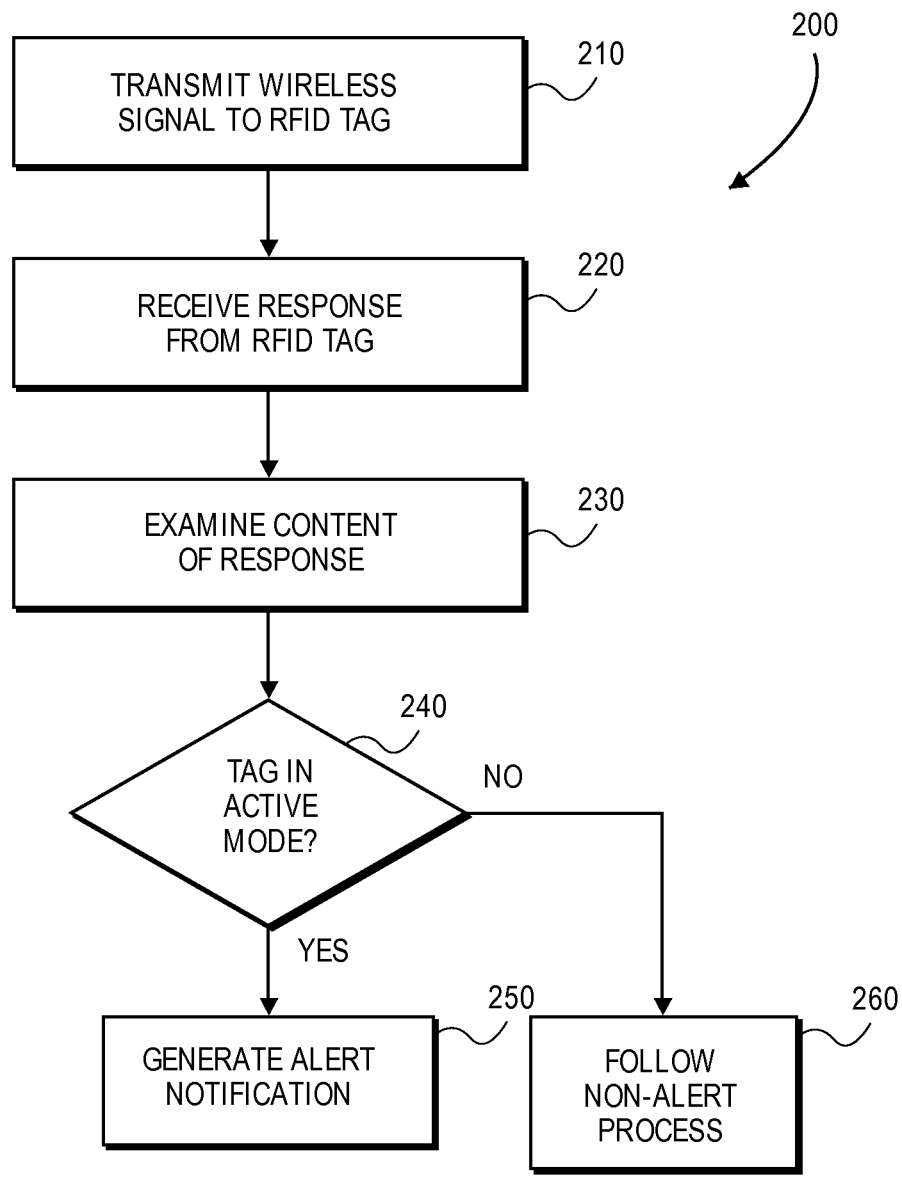
FIG. 2 shows a flow diagram of a method of detecting a switchable condition in an RFID tag, according to an embodiment of the invention.

FIG. 2 shows a flow diagram of a method of detecting a switchable condition in an RFID tag, according to an embodiment of the invention. This method may be performed by an RFID reader, or by an RFID reader in combination with one or more other computing devices. In the illustrated flow diagram 200, at 210 the RFID reader may transmit a wireless signal to an RFID tag, thereby triggering the RFID tag to respond. The signal may be designed to trigger a response from any suitable RFID tag within range, or may be specifically addressed to one or more particular RFID tags.

At 220 the response from the RFID tag is received, and at 230 the information content of that response is examined. If the content indicates that the responding RFID tag is operating in the active mode, as determined at 240, then at 250 the RFID reader may generate and send out an alert notification, or cause one to be generated and sent out by another device. Appropriate additional procedures may then be followed, based on the particular application. However, if the content indicates that the responding RFID tag is operating in the passive mode, as determined at 240, then the RFID tag may trigger procedures at 260 other than an alert notification. In some applications, the non-alert process at 260 may be considered the normal mode of operation, and may relate primarily to identifying the object or person associated with the responding RFID tag, and/or identifying their location as being within a reasonably short distance of the associated RFID reader.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising:
   a radio frequency identification (RFID) tag;
   a battery coupled to the RFID tag;
   a switch coupled between the RFID tag and the battery to engage an active mode of operation; and
   an object coupled to the RFID tag, the battery, and the switch;

wherein the RFID tag is configured to:
  operate in a passive mode of operation to identify the object upon an interrogation from an RFID reader by wirelessly sending the RFID reader an identification number of the RFID tag, the identification number including one or more bits set to a first value that indicates that the RFID tag is operating in the passive mode; and
  responsive to detecting an alert condition associated with the object, the RFID tag is operable to close the switch to engage the active mode of operation and initiate communication with the RFID reader and wirelessly transmit out an alert to the RFID reader, the alert pertaining to the object and comprising the identification number of the RFID tag which includes the one or more bits set to a second value that indicate that the RFID tag is operating in the active mode;
  wherein the RFID tag is configured for a single use of the active mode of operation, wherein the battery is effectively drained in response to closing the switch to engage the active mode of operation, to prevent further uses of the active mode of operation;
  wherein the RFID tag is configured for multiple uses of the passive mode of operation, wherein the RFID reader sends the identification number including the one or more bits set to the first value to the RFID reader in response to a passive use of the RFID tag subsequent to the transmission of the alert in the active mode.

2. The apparatus of claim 1, wherein the switch comprises a membrane switch.

3. The apparatus of claim 1, wherein the switch is one of: a momentary contact switch, a latching switch, or a toggle switch.

4. The apparatus of claim 1, wherein the battery comprises a thick film battery.

5. The apparatus of claim 1, wherein the object is a patient identification bracelet containing the RFID tag, the battery, and the switch.

6. The apparatus of claim 1, wherein the RFID tag is configured to transmit different data in the active mode of operation than in the passive mode of operation.

7. The apparatus of claim 5, wherein the object is configured for attachment to a human patient and wherein the alert condition comprises the human patient pressing a button to switch the RFID tag into the active mode to indicate that the human patient is in distress.

* * * * *